US012153451B1

(12) United States Patent
Perritt, Jr.

(10) Patent No.: US 12,153,451 B1
(45) Date of Patent: Nov. 26, 2024

(54) AUTONOMOUS VEHICLE FORMATION SYSTEM AND METHOD FOR HERDING ANIMALS

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 18/798,755

(22) Filed: Aug. 8, 2024

Related U.S. Application Data

(63) Continuation-in-part of application No. 18/608,136, filed on Mar. 18, 2024, now Pat. No. 12,102,060.

(51) Int. Cl.
G05D 1/695 (2024.01)
B64U 20/83 (2023.01)
B64U 50/39 (2023.01)
B64U 101/40 (2023.01)

(52) U.S. Cl.
CPC ............. G05D 1/696 (2024.01); B64U 20/83 (2023.01); B64U 50/39 (2023.01); B64U 2101/40 (2023.01); B64U 2201/102 (2023.01)

(58) Field of Classification Search
CPC .............................. A01K 29/005; G01D 21/02
See application file for complete search history.

(56) References Cited

U.S. PATENT DOCUMENTS 10,324,462 B2  6/2019  Jassowski
11,565,813 B2  1/2023  Fulbright
2015/0057916 A1*  2/2015  Ishii ................... G01C 21/3697
                                          701/123
2016/0295833 A1*  10/2016  Baize .................... A01K 15/029
2018/0049407 A1*  2/2018  Castelli ................ A01K 1/0029
2018/0160943 A1*  6/2018  Fyfe ........................ A61B 5/1112
2019/0025858 A1*  1/2019  Bar-Nahum .......... G05D 1/0094
2019/0278897 A1*  9/2019  Zhang .................... G07C 5/008
2020/0031465 A1*  1/2020  Chung .................. A01K 29/005
2020/0097023 A1   3/2020  Grundey
2020/0135036 A1*  4/2020  Campbell ............ G08G 5/0026
2020/0154694 A1*  5/2020  Santana ................ A01K 15/023
2020/0218288 A1*  7/2020  Johnson ................. B64U 30/26
2020/0375148 A1*  12/2020  Magazz? .............. A61B 5/0002
2020/0387727 A1*  12/2020  Mishra ................. G01C 21/005
2022/0121836 A1*  4/2022  Dins ..................... G05D 1/0676

FOREIGN PATENT DOCUMENTS

EP         3 468 181 A1    10/2019
WO         2022040744 A1    3/2022

* cited by examiner

Primary Examiner — Hussein Elchanti
(74) Attorney, Agent, or Firm — Henry H. Perritt, Jr.

(57) ABSTRACT

A system and method for herding animals by a formation of autonomous vehicles, representing an improvement on U.S. application Ser. No. 18/608,136, AUTONOMOUS VEHICLE AND METHOD FOR DETECTING STRAYS AND MANAGING HERDS. A plurality of herding vehicles use models derived from research and experience in animal husbandry to direct specific vehicles to specific positions with respect to a herd and to move and to emit sounds and light signals so as to induce the herd to stay together and to move in the desired direction at the desired speed. The system detects animals straying from the herd and deploys herding vehicles to drive them back into the herd. It periodically sends herding vehicles to a battery replacement station to receive fully charged batteries. The system operates in two modes: a roundup mode and a herding mode after a herd is fully assembled.

6 Claims, 12 Drawing Sheets

HERDING VEHICLE-POINT 114

DIRECTION OF TRAVEL
116

HERDING VEHICLE-
LEFT SWING 104

HERD 102

HERDING VEHICLE-
RIGHT SWING 106

HERDING VEHICLE-
LEFT FLANK 108

HERDING VEHICLE-
RIGHT FLANK
110

HERDING VEHICLE - DRAG
112

TRAIL BOSS MODULE

AUTONOMOUS VEHICLE FORMATION SYSTEM AND METHOD FOR HERDING ANIMALS

CROSS-REFERENCE TO RELATED APPLICATIONS

Continuation in part of U.S. application Ser. No. 18/608,136, AUTONOMOUS VEHICLE AND METHOD FOR DETECTING STRAYS AND MANAGING HERDS, filed Mar. 18, 2024, the contents of which are hereby incorporated by reference herein in their entirety. Incorporation by reference and any reference to this application Ser. No. 18/608,136 is not admitted to be prior art with reference to the present invention by its mention in this, the background of the invention, or the detailed description sections.

This application claims the benefit of the filing date of U.S. application Ser. No. 18/608,136.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION BY REFERENCE STATEMENT REGARDING PLAIN TEXT FILES, COMPUTER PROGRAM LISTINGS, SEQUENCE LISTINGS, LARGE TABLES, XML FILES

Not applicable.

STATEMENT REGARDING PRIOR DISCLOSURES BY THE INVENTOR OR A JOINT INVENTOR

Not applicable

BACKGROUND OF THE INVENTION

Hundreds of years of herding animals have taught herders, ranchers, and animal husbandry scientists that certain principles of animal behavior permit animals to be herded by properly positioned herders. Traditionally, the herders for cattle were cowboys positioned around the herd at point, swing, flank, and drag positions. At first, cowboys walked and ran, then they rode horses, then they rode all terrain vehicles (ATVs). While their means of movement have changed, the principles of herding have not. The key concepts are flight zone and point of balance.

The effect of the handler's position on animal movement depends on whether the handler is inside or outside the flight zone. To stimulate movement forward, for example, the handler must be behind the point of balance and inside the flight zone. To simulate movement backward, the handler must be ahead of the point of balance and inside the flight zone.

According to the studies and experiments, a point of balance is usually at an animal's shoulder and is monitored by the animal's wide angle vision. All species of livestock move forward if a handler stands behind the point of balance. They back up if the handler stands in front of the point of balance.

Animal movement stimulated by handler position with respect to flight zone and point of balance spreads throughout a herd. Alternating pressure on the flight zone is more effective than continuous pressure. A handler backs out of the flight zone after a herd begins moving in the correct direction. If the herd stops or slows down, the handler enters the flight zone to apply pressure again.

A group of animals has a group flight zone which can be determined by experimentation on the particular herding occasion.

These principles apply to herds of cattle in fields and on ranges, but they also apply to cattle handling in pens and in chutes.

Long cattle drives of hundreds of miles do not occur as they did in the nineteenth century. But cattle still are allowed to graze on open ranges and in large enclosures and must be rounded up and herded to feedlots and to trucks to transport them for slaughter. The same herding techniques are involved, regardless of the length of the drive.

Autonomous vehicle technology has progressed to the point that unmanned aerial vehicles, popularly known as drones, and ground vehicles of the all-terrain vehicle (ATV) type regularly perform functions in various industries supplementing and replacing human workers. These vehicles, as they are delivered off the shelf, have sophisticated navigation and control systems that allow them to know their location from a combination of global positioning system (GPS) signals, inertial measurement units (IMUs) and data from cameras, sonar sensors, and Lidar. They respond to commands from a remote control devices and can be programmed to execute particular maneuvers with respect to a defined object. Vendors of these systems provide application program interfaces (APIs) allowing users to write computer code widely accessible programming languages, such as Python, that supplements the vehicle's built-in navigation and control systems, thus permitting the vehicles to perform specialized tasks suitable for application in particular industries.

Typical off-the-shelf systems allocate computational responsibility between remote control devices and autonomous vehicles to minimize harmful latency and to maximize efficient use of radio links. Typically, remote control devices send high-level commands, such as destinations or speed limits, over the radio link to the vehicle, relying on the vehicle's onboard systems to translate these commands into detailed execution instructions for actuators and propulsion systems. This allocation of responsibility minimizes the data transmission required between the controller and the vehicle, reducing latency and enhancing responsiveness. It also allows the remote device to maintain a simpler, more intuitive user interface, and relieves the remote control device from processing large amounts of sensor data required for real-time navigation and obstacle avoidance.

Remote control devices delivered with herding vehicles have navigation and control systems that work in conjunction with on board vehicle systems to translate user commands into detailed signals for actuators that control vehicle movement and stability.

Off-the-shelf commercially available battery replacement stations are capable of receiving a herding vehicle on a landing pad, removing its battery, and replacing the battery with a fully charged one suitable for the vehicle. The stations have a source of electrical power, and components that charge batteries.

Separate from these developments in autonomous vehicle technology, developers have deployed machine learning techniques to develop algorithms that enable image recognition systems capable of determining whether a newly obtained image depicts a particular animal or group of animals such as a cow or a cattle herd.

In the livestock industry managers of herds, known variously as herders, cowboys, and drovers, make use of a deep knowledge of innate animal behavioral characteristics and learn the kinds of actions by them that will influence animal movement. An experienced herder knows how to position himself and how to move so as to cause an individual animal to move in a particular direction at a desired speed. Experienced herders know how to position themselves around a herd of animals so to control it—to keep it bunched up, to cause strays to return to the herd, to cause a herd to move in a particular direction, to turn left or right, to speed up, to slow down, and to stop.

Animal husbandry research and experience teaches that certain movements, sounds, and visual stimuli such as light flashes are effective in motivating animal movement. Experienced herders and researchers in animal behavior also have learned the kinds of sounds, light flashes, and movements of vehicles and other objects most likely to be effective to reinforce directions to individual animals and to herds. For example, a vehicle might move rapidly left and right and in and out (referred to herein as "buzzing" or "buzz"); an audio device can simulate human shouts such as "Hi-yah," "Yee-hah," or "Yip, yip, yip!"; an audio device can simulate an animal utterance such as a particular type of "moo" signifying distress, contentment, or other conditions. A light on the vehicle can flash rapidly.

These disparate developments in autonomous vehicle technology, animal behavior, animal image recognition enabled by artificial intelligence, and signaling by herders animals have not been combined so as to achieve practical automated herding systems.

The invention covered by U.S. application Ser. No. 18/608,136, AUTONOMOUS VEHICLE AND METHOD FOR DETECTING STRAYS AND MANAGING HERDS, took a first step in filling this gap. It describes an automated vehicle, a drone in one embodiment, and a land-based vehicle in another, that make use of off the shelf vehicles, off the shelf repositories of animal images, descriptions of sounds light signals, and movements, and knowledge of flight zones and points of balance as means of detecting animals that have strayed from a herd and to cause such animals to return to the herd.

This invention improves on U.S. application Ser. No. 18/608,136, AUTONOMOUS VEHICLE AND METHOD FOR DETECTING STRAYS AND MANAGING HERDS, by deploying multiple vehicles described in that application in formation to control entire herds.

BRIEF SUMMARY OF THE INVENTION

The system and method represent an improvement on U.S. application Ser. No. 18/608,136, AUTONOMOUS VEHICLE AND METHOD FOR DETECTING STRAYS AND MANAGING HERDS, which describes a system and method for using autonomous vehicles to detect strays and to drive them back into a herd. The herding vehicles can be off-the-shelf, commercially available autonomous aerial vehicles, popularly known as drones, delivered with remote control devices, or they can be off-the-shelf, commercial available autonomous all-terrain vehicles delivered with remote control devices. This invention describes a formation of such autonomous vehicles organized so as to control and drive an entire herd.

It comprises a formation of herding vehicles with an onboard maintain-station subsystems that receive, via radio links, commands from a trail boss module and interfaces those commands with onboard navigation and control systems delivered with the vehicles.

The trail boss module receives data and commands from a human operator defining the initial position for herd collection, target destination for the herd, the mode of operation, whether roundup or herding, and any desired changes in herd speed or heading. If any of these values have been set by the autonomous system, the human operator has the power to change them.

The trail boss module uses information about animal images derived from off-the-shelf machine learning systems, information about animal behavior derived from research and experimentation about the behavior of herding animals, and information about movements, sounds, and visual cues most effective in causing particular animal behaviors. It combines this information with data received from the vehicles about their position with respect to the herd to compute commands regarding new vehicle positions, speeds, and alerts.

The trail boss module positions the herding vehicles at stations in the formation so that they collectively surround the herd and so that their individual movements cause the herd to stay together than to move in the desired direction at the desired speed.

Each herding vehicle monitors its electrical charge remaining and signals the trail boss module when the remaining charge is less than a pre-determined level—15% in the preferred embodiment. Upon receiving such a signal, the trail boss module commands the vehicle to go to a battery replacement station, which automatically extracts the nearly depleted battery and replaces it with a fully charged one. The trail boss module commands one of the other vehicles to take up the station vacated by the vehicle having its battery replaced and reassigns the returning fully-charged vehicle to another station.

The system and method operate in two modes: a roundup mode and a herding mode. In the roundup mode, the trail boss commands individual herding vehicles to approach discrete animals or small groups and to herd them together with other animals until a herd is formed.

In the herding mode the system and method use models of animal behavior derived from research and experience to positon herding vehicles in traditional herder positions with respect to a herd and to move so as to keep the herd together and to cause it to move in desired directions and speeds toward an arbitrary target destination.

The herding vehicles may be ground vehicles such as ATVs, or they may be aerial vehicles such as drones.

DEFINITIONS

Figure 1:
FIG. 1 is an overview of the formation of herding vehicles at their stations surrounding the herd.
Figure 1:
Figure 1:
Figure 1:
Figure 1:
Figure 1:
Figure 1:
Figure 1:
Figure 2:
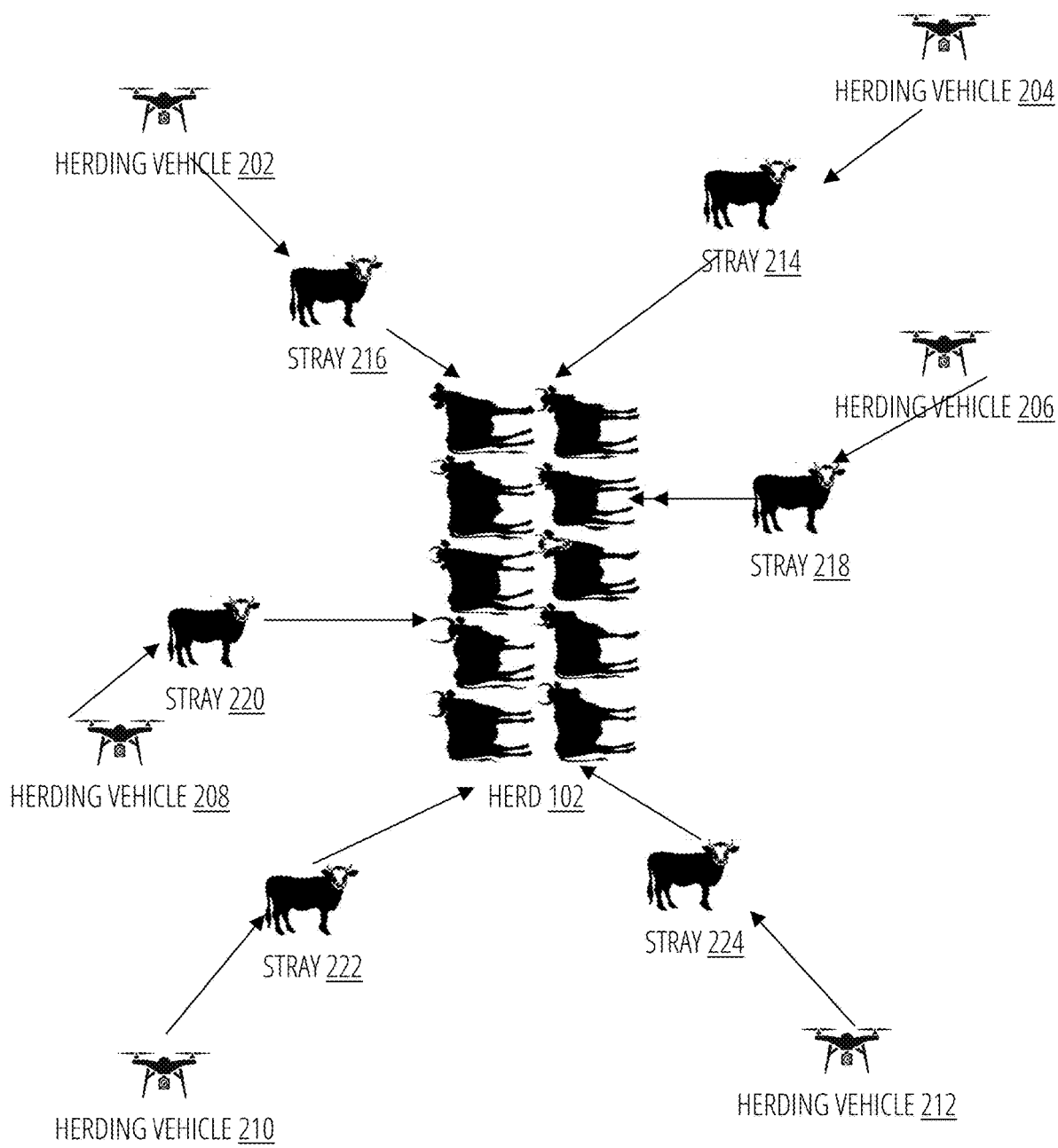
FIG. 2 depicts the roundup process
Figure 3:
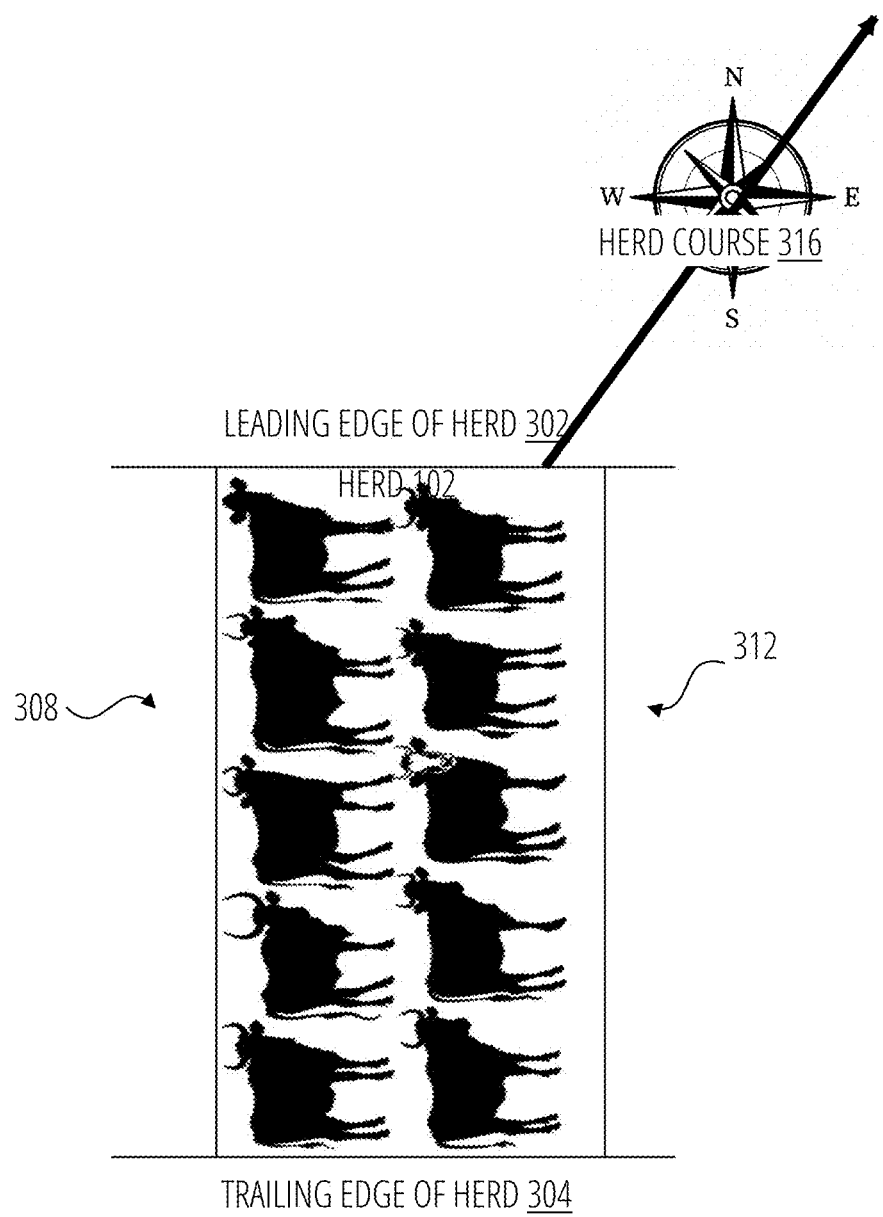
FIG. 3 illustrates the herd edges and course.

The terms "course" and "heading" mean the same thing: the direction of a path over the ground expressed as degrees from North.

The terms "corral," "drive," and "bunch" have the same meaning: causing an animal to move.

For efficiency in explanation, the herding vehicle—point is frequently referred to at the "point;" the herding vehicle—left swing is frequently referred to as the "left swing;" the herding vehicle—left flank is frequently referred to as the "left flank;" the herding vehicle—drag is frequently referred to as the "drag;" the herding vehicle—right flank is frequently referred to as the "right flank;" the herding vehicle—right swing is frequently referred to as the "right swing;" and a herding vehicle—stray catcher is frequently referred to as a "stray catcher."

DETAILED DESCRIPTION

This is a continuation in part of U.S. application Ser. No. 18/608,136, AUTONOMOUS VEHICLE AND METHOD FOR DETECTING STRAYS AND MANAGING HERDS, filed Mar. 18, 2024, the contents of which are hereby incorporated by reference herein in their entirety. Incorporation by reference and any reference to this application Ser. No. 18/608,136 is not admitted to be prior art with reference to the present invention by its mention in this, the cross-reference, or the background of the invention sections.

The system and method represent an improvement over the system and method covered by U.S. application Ser. No. 18/608,136, AUTONOMOUS VEHICLE AND METHOD FOR DETECTING STRAYS AND MANAGING HERDS. Application Ser. No. 18/608,136 describes a single autonomous vehicle capable of detecting an animal that has strayed from a herd and moving so as to cause the animal to return to the herd.

The herding vehicle defined in U.S. application Ser. No. 18/608,136, AUTONOMOUS VEHICLE AND METHOD FOR DETECTING STRAYS AND MANAGING HERDS, has sensors, machine-learning derived templates, and algorithms that permit it to identify a herd and to locate it by its latitude and longitude. This improvement uses those features of the invention covered in U.S. application Ser. No. 18/608,136, AUTONOMOUS VEHICLE AND METHOD FOR DETECTING STRAYS AND MANAGING HERDS, to communicate the latitude and longitude of each edge of the herd to the trail boss module. Each edge is defined by the latitude and longitude of the point connecting it with the next orthogonal edge. For example, the leading edge of the herd 1102 is defined by the latitude and longitude of the point connecting it to the right edge of the herd 1112 and the latitude and longitude of the point connecting it to the left edge of the herd 1108.

The herding vehicles defined in U.S. application Ser. No. 18/608,136, AUTONOMOUS VEHICLE AND METHOD FOR DETECTING STRAYS AND MANAGING HERDS, have a herding module which calculates a circle defining an animal's flight zone and a ray at a particular angle from an animal that defines its point of balance. The herding vehicles defined in U.S. application Ser. No. 18/608,136, AUTONOMOUS VEHICLE AND METHOD FOR DETECTING STRAYS AND MANAGING HERDS, also have navigation modules that compute vectors representing paths the vehicle must follow to herd strays back into a herd. The improvement makes use of these modules and the data they calculate.

The herding vehicles covered by U.S. application Ser. No. 18/608,136, AUTONOMOUS VEHICLE AND METHOD FOR DETECTING STRAYS AND MANAGING HERDS, contain an alerter module which is capable of commanding rapid movements back and forth, in and out, flashing lights, sounds of cowboy shouts, and sounds of distressed animals. The improvement enlarges the sounds, lights, and movements available to the vehicles.

This system and method extend the concept of U.S. application Ser. No. 18/608,136, AUTONOMOUS VEHICLE AND METHOD FOR DETECTING STRAYS AND MANAGING HERDS. to use a formation of autonomous vehicles to control an entire herd 102 of animals, placing the vehicles in positions with respect to the herd that animal husbandry research and experience teach are effective. The collection of herding vehicles is the "formation." Each position in the formation is a "station."

The herding vehicles in this application are identical one with another, regardless of the station to which they have been assigned in the formation. Thus the herding vehicle-point 114 is identical to the herding vehicle-drag 112, and both are identical to the herding vehicle-left swing 104 and to the herding vehicle-right flank 110.

The system and method provide for the continuous operation of the herding vehicles by allowing them to leave their positions in the formation and travel to a battery replacement station 820, where their batteries are automatically replaced with fully charged ones.

This method and system extend knowledge gained from animal husbandry to apply a wider variety of visual, audible, and movement signals than U.S. application Ser. No. 18/608,136, AUTONOMOUS VEHICLE AND METHOD FOR DETECTING STRAYS AND MANAGING HERDS, covers, to exercise more detailed control of a herd.

The system comprises maintain-station modules on board the herding vehicles, a trail boss module integrated with the remote control devices delivered with off-the-shelf vehicles, and an off-the shelf battery replacement system.

The maintain-station module comprises several computing devices: a maintain station computer 902, a radio bus 908, a radio link 910, an API bus 906, and a herding vehicle data structure 918. The data structures and algorithms are connected through the data buses and radio links. The maintain-station module on each herding vehicle communicates with computer and navigation and control systems built into the vehicle and delivered with it through the API bus 906. The maintain-station module in each herding vehicle communicates with a trail boss module and the battery replacement station 820 by means of a radio link 910. The radio busses and radio links handle digital messages comprising telemetry data and reports from and commands to herding vehicles.

The trail boss module comprises several computing devices: a trail boss computer 1002, a trail boss radio bus 1008, a radio link 910, a remote control API bus 1006, copies of the herding vehicle data structures 1014, a trail boss data structure 1018, and a herd data structure 1022. The trail boss module interacts with the computer built into and delivered with the remote control device for the herding vehicles via a remote control API bus 1006. It communicates with all of the herding vehicles by means of a radio link 1010.

Access to the data busses and to the radio busses is controlled by the well-known Carrier Sense Multiple Access/Collision Detection (CSMA/CD) protocol. Particular elements of maintain-station modules, the trail boss module, and the battery replacement station are addressed according to the value of an address field in a radio message.

Program code pursuant to which the maintain station computer 902 interacts with the built-in navigation and control system and pursuant to which the trail boss computer 1002 interacts with the delivered remote control devices is written in a common programming language such as Python and interfaced through APIs defined in the herding-vehicle vendor's software development kit (SDK).

Three data structures exist that, collectively, represent the state of the system and its components at any point in time: the herding vehicle data structure 918, the trail boss data structure 1018, and the herd data structure 1022. Each instance of the herding vehicle data structure 918 corresponds to one herding vehicle. The structure has slots for: vehicle number 912, assigned station 920, target position 922, current position 924, speed 926, heading 928, battery charge remaining 930, alert 932, and status 934. Position slots accommodate three-dimensional vectors, comprising latitude, longitude, and altitude. The status slot contains values signifying on-station, receiving charge, and relieved. Additional slots may be provided in other embodiments.

The herd data structure 1022 contains slots for herd target location 1038, initial herd gathering location 1040, herd present location 1042, herd speed 1044, and herd bearing 1046. Values for the herd location variables comprise latitude, longitude, and altitude for each corner of the herd defining its edges. Additional slots may be provided in other embodiments.

The trail boss data structure 1018 contains slots for flight-zone radius 1024, point-of balance 1026, herd target location 1028, an index of herding vehicle assigned stations 1030, an index of herding vehicle status 1032, battery-replacement station location 1034, and stray locations 1036. The flight-zone radius and point-of-balance are single-value variables derived from animal husbandry science and experience and adjustable by the human user depending on his knowledge of the nature of the herd and the conditions of its environment. The stray location slot 1036 accommodates a list containing multiple stray locations. Additional slots may be provided in other embodiments.

The system is capable of operating in either one of two modes: a roundup mode or a herding mode. The roundup mode is used when no animals or only a few animals have formed into a herd. It frees up herding vehicles to take up stray catcher positions to round up individual animals and to drive them into a herd. In the roundup mode, the location of the herd is defined arbitrarily as a particular location.

In the round up mode, the improvement comprises a coordination of multiple herding vehicles with stray detection and herding capabilities covered by U.S. application Ser. No. 18/608,136, AUTONOMOUS VEHICLE AND METHOD FOR DETECTING STRAYS AND MANAGING HERDS.

In the preferred embodiment of roundup mode, at most two vehicles are assigned to control the building herd, one herding vehicle-point 114 and one herding vehicle-drag 112, which move in semi-circles around the front and back of the herd respectively. Collectively and moving thus, the two are capable of keeping a small herd together. The other six herding vehicles 202 to 212 are assigned as stray catchers. As the herd builds, two and then four of the stray catchers are reassigned to herding stations.

At the beginning, all the animals are strays 214-224 with respect to the, initially empty, herd 102 position. As the stray catchers are launched, they roam until they detect an animal not in the herd location. They then send a message to the trail driver with that strayed animal's position, and the trail boss module directs the nearest stray catcher vehicle among herding vehicle 202 to herding vehicle 212 to herd that stray into the herd 102 position.

When the herd has been assembled, the roundup mode is complete and the system transitions into the herding mode. In the herding mode, the herding-vehicle stations are defined as follows with respect to the herd, which is moving in the direction indicated in FIG. 1 316. The point is typically in front of the herd, 10 to 50 feet away from the leading edge of the herd 1102, just outside the flight zone. The drag is behind the herd, typically 10 to 50 feet away from the trailing edge of the herd 1104, just outside the flight zone, and constantly moving sideways from left to right and back. The left swing is on the left side of the herd toward the front. The left flank is on the left side of the herd toward the rear, both typically 10 to 50 feet away from the left edge of the herd 1108, just outside the flight zone. The right flank is on the right side of the herd toward the rear, and the right swing is on the right side of the herd toward the front, typically 10 to 50 feet away from the right edge of the herd 1112, just outside the flight zone. The stray chasers have no fixed position but roam in the vicinity, remaining proximate to the herd so they are available to identify strays and corral them back into the herd as necessary.

At the option of the user, spare herding vehicles can be provided and remain at or near the battery-replacement station to be deployed to replace any original vehicle that has malfunctioned.

Once the trail boss module has assigned a herding vehicle to a particular station in the formation, the herding vehicle assumes responsibility for maintaining that station and reporting strays; in other words, whatever computation is necessary is performed on board the vehicle, in the maintain-station computer 902, eliminating the need for repeated telemetry or command radio signals until and unless a herding vehicle's station is changed, it needs a fresh battery, or the herd is redirected. The onboard maintain station computer 902 places values for the target position of the vehicle on the API data bus 906 of that vehicle, from which they are retrieved by the built delivered navigation and control system 904 and translated into pitch, yaw, roll, and thrust commands appropriate to cause the vehicle to close on the target position.

The maintain-station computer 902 constantly recomputes the target position for the vehicle from updated information about the position of the herd. It applies flight zone and point of balance information in that computation. As the current position of the vehicle differs from the target position, the maintain-station module sends appropriate speed and heading commands to the built-in navigation system of the vehicle, which translates them into actuator commands for the propulsion, suspension, and steering subsystems of the vehicle.

The trail-boss module communicates with one or more remote control devices delivered with the herding vehicle. In one embodiment, a remote control device delivered with a herding vehicle is modified to make it capable of communicating with any or all of the remote control vehicles comprising a formation by addressing them individually over the radio link or by addressing all of them. This modified remote control device is physically connected to the trail boss module in an appropriate enclosure. In an alternative embodiment, each herding vehicle has its own remote control device delivered with the vehicle, in which case the trail boss module sends data to and receives data from each remote control device separately for its assigned vehicle.

The trail-boss module maintains a copy of each vehicle's data structure 1014 and updates it periodically, once per second in the preferred embodiment. The trail-boss module also maintains a data structure for the herd 1022 and similarly updates it at the same frequency. The trail-boss module has templates for each station in the formation, derived from research and experience in animal husbandry. Those templates contain values for distance from the edge of the herd and angle with respect of the herd, representing flight zone and point of balance. It uses these templates to calculate assigned positions for station and transmits the position value to the herding vehicle assigned to that station. Each vehicle maintains and updates the position data thereafter through its maintain-station computer 902. The trail-boss module transmits the entire contents of the template for each herding vehicle to that vehicle and transmits an updated copy whenever the values change.

Values are read onto the API bus 906 from the herding vehicle data structure 918, from whence they are read into the herding vehicle's delivered navigation and control system 904. Values for current location, speed, and heading are placed onto the API bus by the supplied navigation and control system and read into the herding vehicle data structure.

Commands from the trail boss module are read from the radio bus 908 into the herding vehicle data structure 918. These include assigned station, commanded position, and alert. These values are taken from the data bus and read into the maintain station computer 902 and transformed as necessary into values for handling by the the delivered navigation and control system 904.

Figure 9:
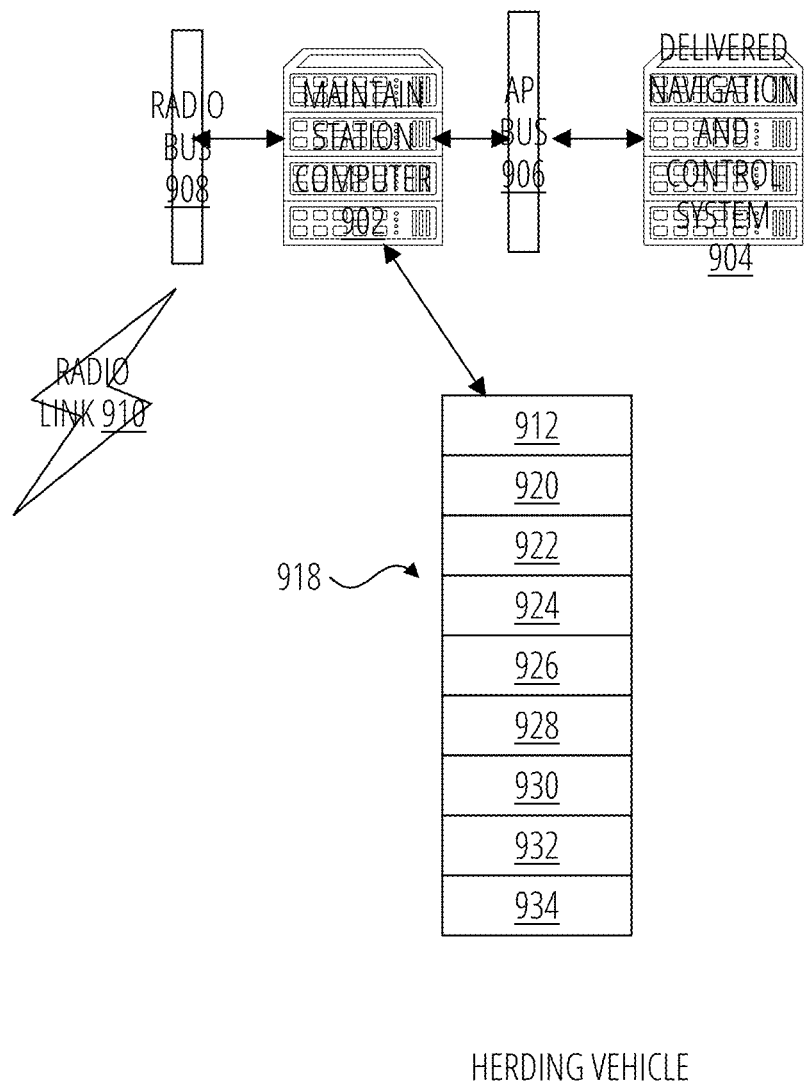
FIG. 9 depicts the onboard herding vehicle module.
Figure 10:
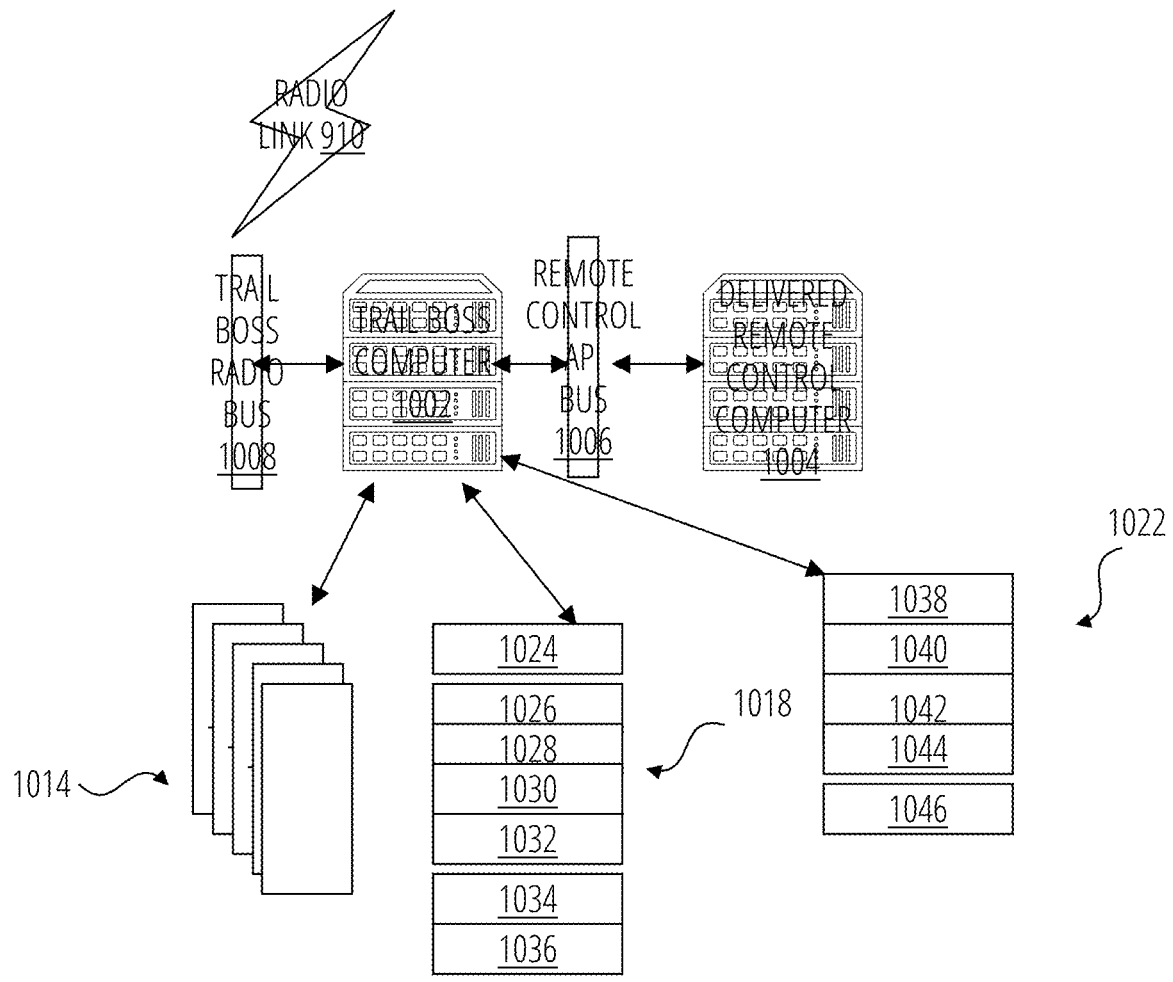
FIG. 10 depicts the trail boss module.

FIG. 9 depicts the relationship of the onboard maintain station computer 902, the delivered navigation and control system 904, the herding vehicle data structure 918, the API busses 906 and 1006, and the radio busses 908 and 1008.

The trail boss module communicates with the delivered remote control device via a remote control API bus 1006, and with the herding vehicles via the trail boss radio bus 1008 and radio link 910. In some embodiments, the trail boss module has its own computer; in other embodiments it uses the computer supplied with the delivered remote control device. Whichever computer is employed performs the necessary arithmetic and trigonometric computations, applies the supplied machine learning derived templates and models of herd behavior to develop location commands and alert signals.

The intelligence, data, and algorithms pertinent to the entire herd are maintained in the trail boss module; intelligence, algorithms, and data from single vehicle sensors, to determine locations and movements, are maintained on board the vehicles.

Once the trail boss module has received position data from the herding vehicles about the current position of the herd, it uses its models of flight zone and point of balance to calculate latitude and longitude offsets from the edges, which define each station. The flight zone for the entire herd is defined by a circle with a diameter determined from animal husbandry research and experience. The point of balance for the entire herd is representing by two rays from the herd at an angle from its head, usually about thirty degrees and two-hundred-ten degrees clockwise. The arithmetic combination of the offsets with the current herd position represents the latitude and longitude values for the current position of each herding vehicle, which values are entered into the herding vehicle data structure 918.

Once all the herding vehicles are on station, the trail boss module commands them to begin to move the herd. The herd is put in motion by the drag's 112 entering the flight zone of the animals at the rear, the point's 114 increasing its distance from the front of the herd to make sure it is not in the herd's flight zone, the flank and swing vehicles' closing in so they are within the flight zone and behind the point of balance of animals on the side, and the stray catchers' moving so as to reinforce the movements of the drag and the swing and flank vehicles.

Once the herd is moving, the point drops back and maintains a position just forward the flight zone of the leading animals of the herd, the drag drop back and periodically enters the flight zones of the animals at the rear of the herd to keep the herd moving with the proper speed, and the flank and swing vehicles, aided by the stray catchers deal with laggard animals or animals that appear to be drifting away from the main herd by entering their flight zones at the appropriate position with respect to their points of balance.

The effect resembles a moving virtual cocoon surrounding the herd, keeping it together and keeping it moving in the desired direction toward the herd's target position.

If a herding vehicle detects a stray not more than a prescribed distance—ten feet away, in the preferred embodiment—from its current position, it drives that stray back into the herd according to the protocols defined in U.S. application Ser. No. 18/608,136, AUTONOMOUS VEHICLE AND METHOD FOR DETECTING STRAYS AND MANAGING HERDS. If the stray is more than that distance away from the herding vehicle, the herding vehicle reports the stray's location to the trail boss module, which assigns a straight catcher to drive that stray back into the herd.

During this process, any animal that moves more than a predefined distance, ten feet in the perverted embodiment, away from the main herd is treated as a stray and handled by the nearest stray catcher.

After a stray is detected pursuant to the protocols described in U.S. application Ser. No. 18/608,136, AUTONOMOUS VEHICLE AND METHOD FOR DETECTING STRAYS AND MANAGING HERDS, the trail boss module assigns it to the nearest stray catcher, unless it is within the prescribed distance of the herding vehicle that that detected it, in which case the trail boss module assigns the stray to that herding vehicle. No other herding vehicle chases that stray or undertakes to drive it back into the herd.

At least three radio channels connect the herding vehicles with the trail boss module and the delivered remote control devices: the control channel delivered with the vehicle and the delivered remote control device, usually a separate channel for video and other types of imagery, and the radio link 910. The system and method use the radio link 910 for telemetry from the herding vehicles and herding commands to the herding vehicles to make sure of adequate bandwidth, which might be limited on the other two channels.

The trail boss module comprises a video display touchscreen on which a human operator can see the position of the herd, the position of all of the herding vehicles, and the state of those vehicles with respect to battery replacement. This human interface permits the operator to change target location for the herd and to provide herd direction change commands to follow terrain features as desired in input devices comprising the touchscreen, a keyboard, a mouse, and a microphone driving speech-to-text translation processes.

Each command in the command set is expressed in a radio message comprising an address field, a command field, and fields for parameters suitable to the command. In the following examples, Xx signifies the address of a particular vehicle, TB signifies the address of the trail boss module, and Bdcast signifies a message addressed to all the vehicles and to the trail boss module. The words inside the parentheticals following the commands comprise allowable values for that command, not the parameter to hold those values. For example, the herd speed command has one parameter, the values of which can be slow down or speed up. When the command is given, one of these values comprises the argument.

The trail boss module can cause the herding vehicles to form around the herd, by sending an assignment message to each of them, in the form:

Xx, assign (station), where Xx is the address of the herding vehicle; e.g., 104, assign is the command, and station is the parameter, with a value of: point, left swing, left flank, drag, right flank, right swing, stray catcher no. 1, stray catcher no. 2, or recharge. A herding vehicle-104 may be reassigned to another station by sending it an assign comment with a different station value.

When a stray is detected, the herding vehicle first detecting it broadcasts a message in the form: Bdcast, straydetected(lat, long). The trail boss module then sends a message to the stray catcher closest to the stray in the form: Xx, chasestray(lat,long). The stray catcher thus commanded uses the systems and methods of U.S. application Ser. No. 18/608,136, AUTONOMOUS VEHICLE AND METHOD FOR DETECTING STRAYS AND MANAGING HERDS, to corral the stray back into the herd.

Each herding vehicle can transmit the following telemetry reports, among others: Bdcast, herdposition(frontEdge, leftEdge, rightEdge, trailingEdge); Bdcast, herddestination(lat, long); Bdcast, herdcourse(degrees); Bdcast, mode(roundUp, herding).

When a herding vehicle-104 detects a low battery level, 15% in the preferred embodiment, it sends a message to the trail boss module in the form: TB, replacement(request). After a herding vehicle goes to the battery replacement station 820 and receives a fully charged battery, it sends a message to the train boss module in the form: TB, replacement(received), whereupon the trail boss module issues an appropriate assign command to the vehicle.

Figure 4:
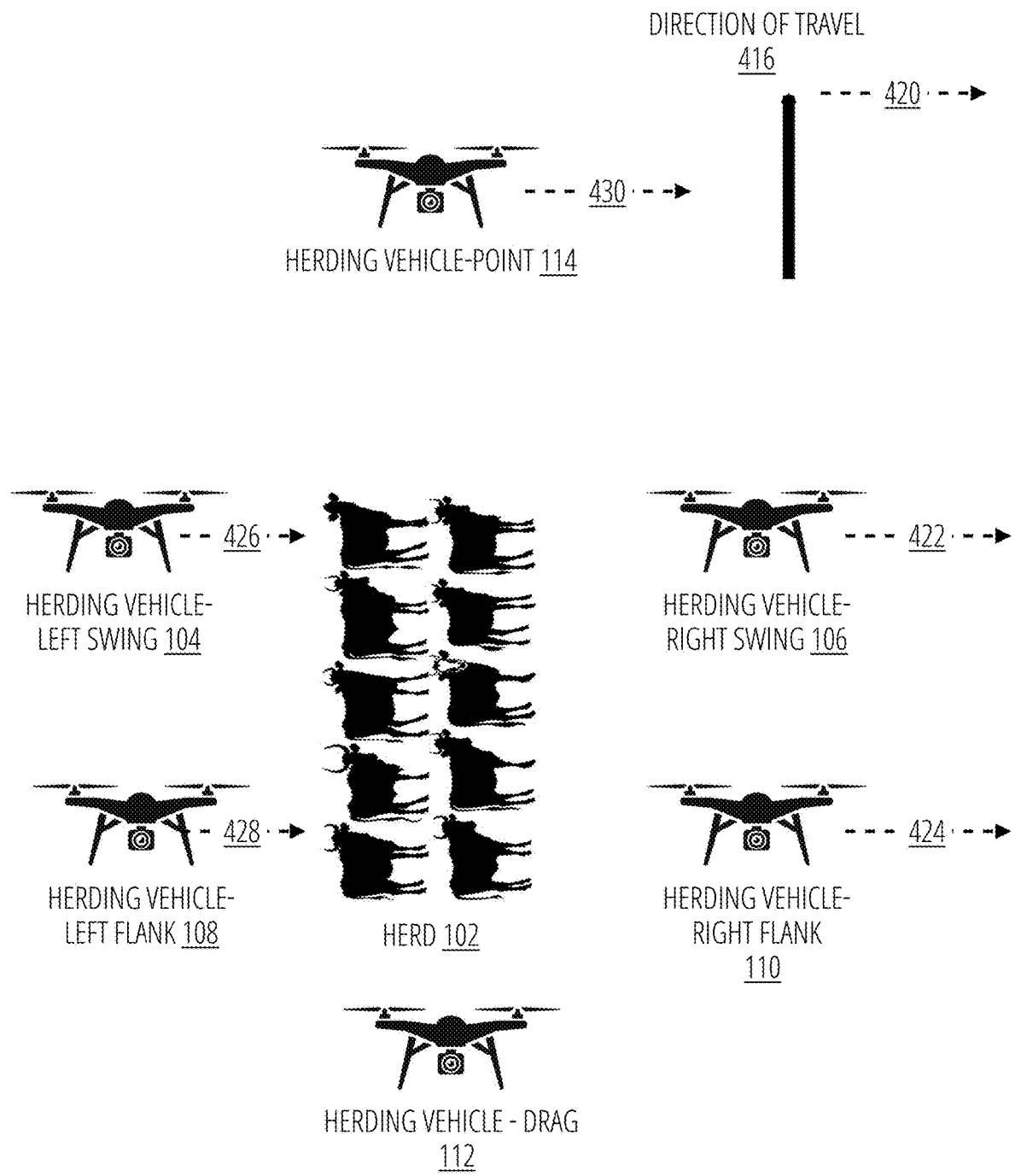
FIG. 4 depicts the movements of the herding vehicles when the herd is to be turned to the right.
Figure 5:
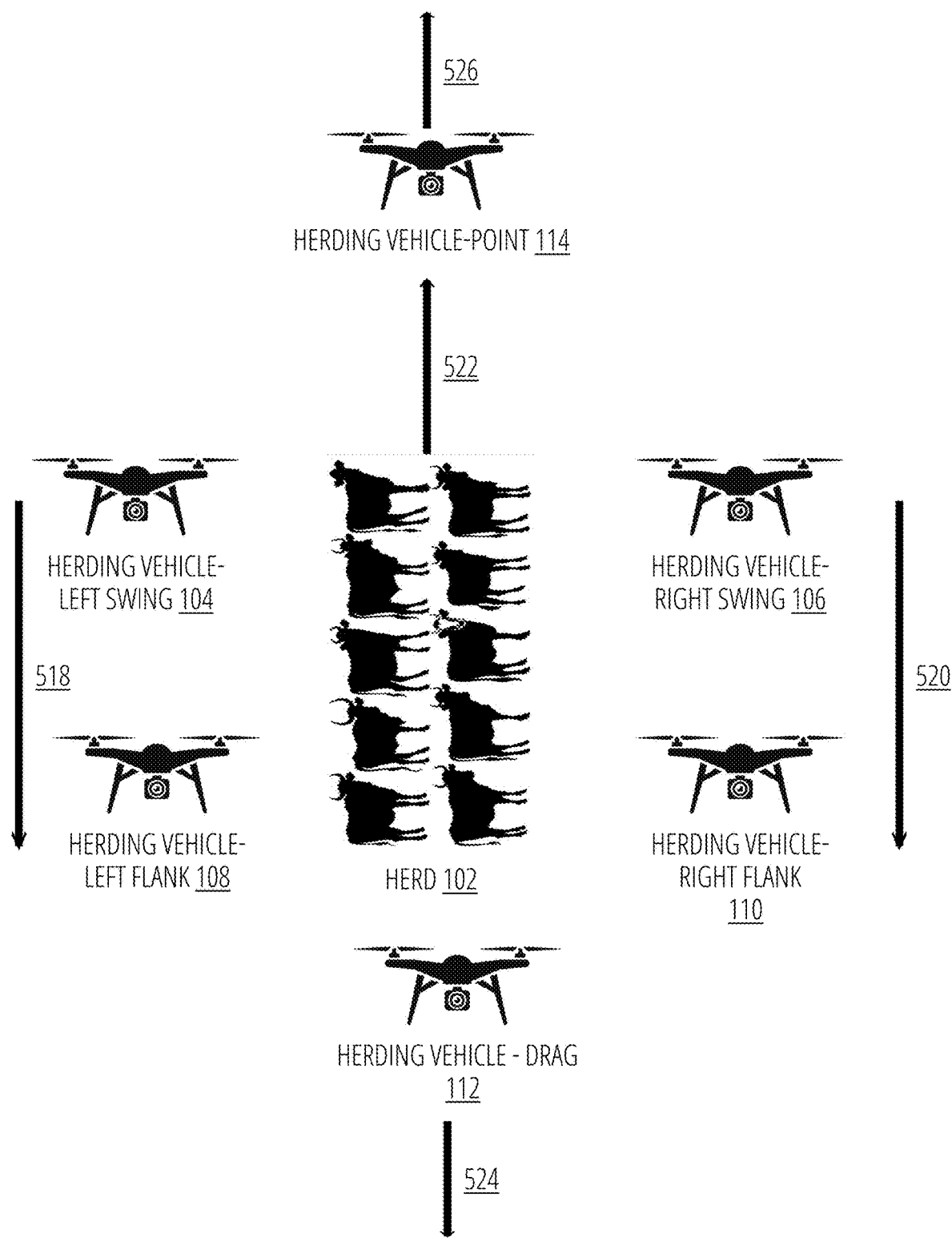
FIG. 5 depicts the herding vehicle movements to speed the herd up.
Figure 6:
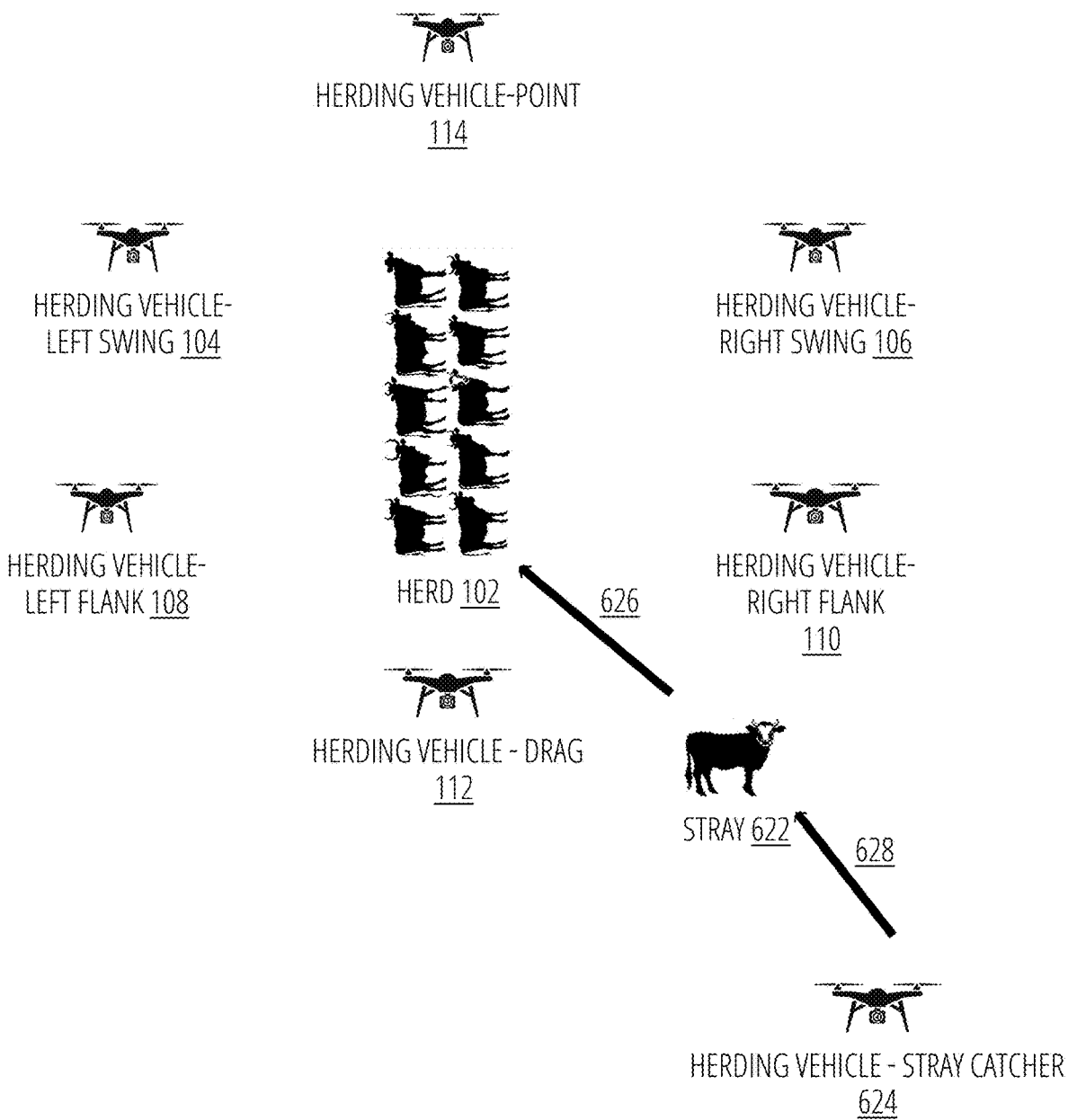
FIG. 6 depicts a stray chaser vehicle herding a stray back into the herd.

When the system wants to change the herd's direction, say to the right, as depicted in FIG. 4, either to adjust its course to reach the target location, or to avoid some obstacle. It calculates a new commanded heading for the herd and issues the following command over the radio link 910

Turn(right, 92°), to the herding vehicle point, where 92° is an example of one possible new heading.

Flight zone(enter), to the left swing and left flank herding vehicles

Flight zone(withdraw) to the right swing and right flank herding vehicles

Flightzone(withdraw), to the draft herding vehicle

Each vehicle receiving these commands employs its onboard sensor data and logic to alter direction and speed as appropriate to carry out the commands.

The point 114 moves in the desired direction, to the right in the figure, and the right swing herding vehicle-right swing 106 and right flank herding vehicle-110 do the same, increasing the distance between them and the herd. The left swing 104 and left flank 108 also move right, entering the flight zone of the animals on the herd's left. The drag 112 follows the herd as it turns. The result is that the herd turns to the right, motivated primarily by the entry of the left swing and left flank into the flight zone of the animals on the herd's left periphery. The right swing and right flank move to the right primarily to stay out of the flight zone of the animals on the herd's right periphery as it turns.

The left swing and the right swing move more to the right than the left flank and the right flank in order to cause the animals in the front of the herd to move more to the right than those in the back of the herd.

The system causes the herd to turn to the left by similar movements except, that the vehicles move to the left rather than to the right.

When the system wants to cause the herd to speed up, the left swing, left flank, right swing and right flank and drag vehicles slow down. This causes the herd to speed up, and the point vehicle also speeds up to stay out of the flight zone of the lead animals in the herd. This counterintuitive phenomenon occurs, because of the herd's instinct to move away from the vehicles, which they do as the herd speeds up while the vehicles (except for the point) slow down. The command is Xx, pointofbalance(back) to speed the herd up.

Similarly if the system wants the herd to slow down, the left swing, left flank, right swing, right flank speed up. The drags slows down to avoid the flight zone of the animals in the back of the herd. That causes the herd to slow down. The point vehicle slows down to maintain its original distance from the leading animals of the herd. The herd slows down to move away from the herding vehicles. The command is: s are: Xx, pointofbalance(forward), to cause the herd to slow down.

The trail boss module comprises logic that enables herding vehicles to corral strays back into the herd and that enables herding vehicles leaving the formation to receive a fresh battery to be replaced temporarily.

When the system detects that an animal has strayed from the herd, the stray catcher module deploys the closest stray catcher vehicle to close on the stray and to corral it back into the herd, as described in U.S. application Ser. No. 18/608, 136, AUTONOMOUS VEHICLE AND METHOD FOR DETECTING STRAYS AND MANAGING HERDS.

Figure 7:
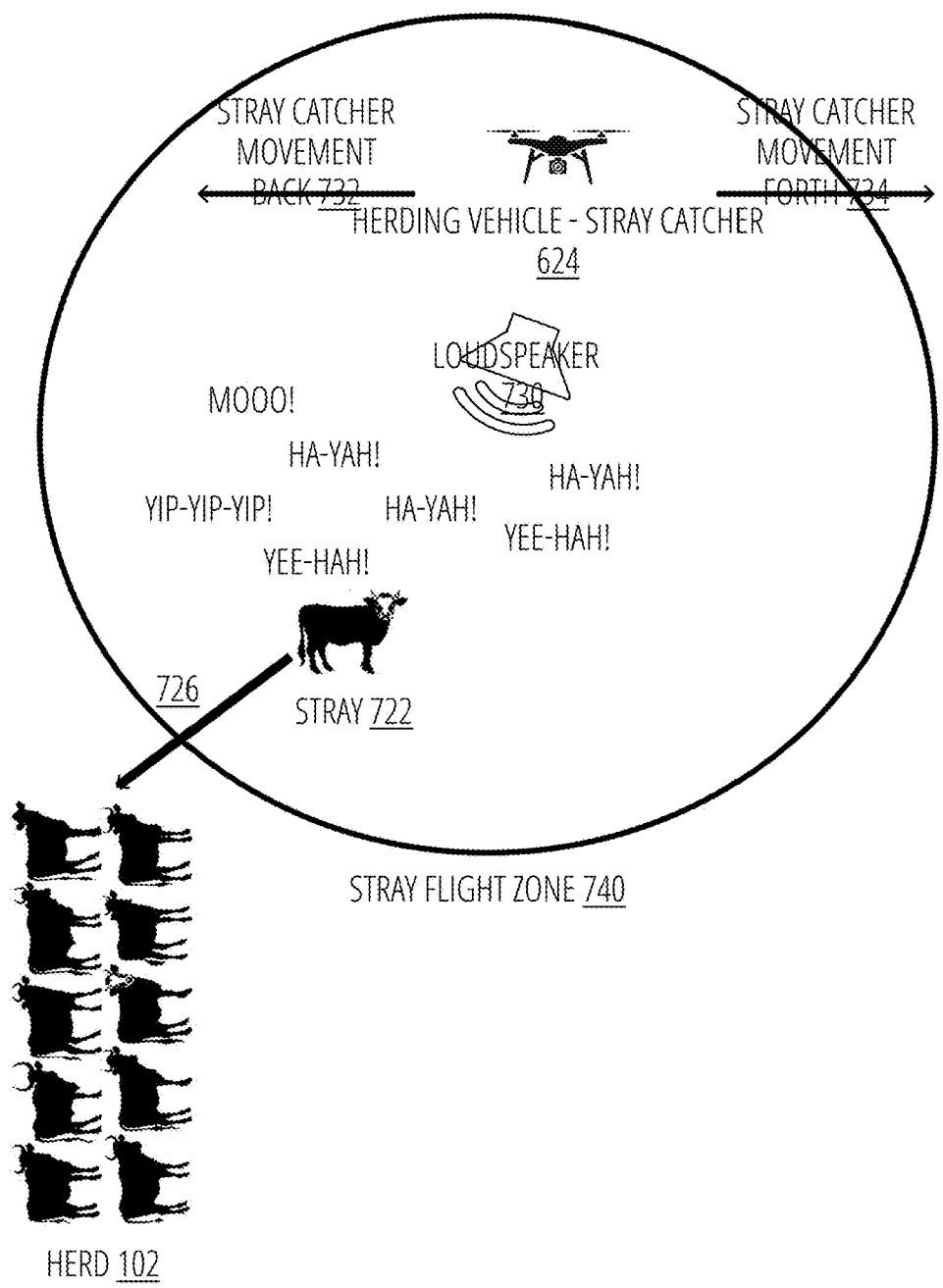
FIG. 7 depicts a stray chaster vehicle entering the flight zone of a stray and using its buzzing movements and audio sounds to corral the stray back into the herd.
Figure 8:
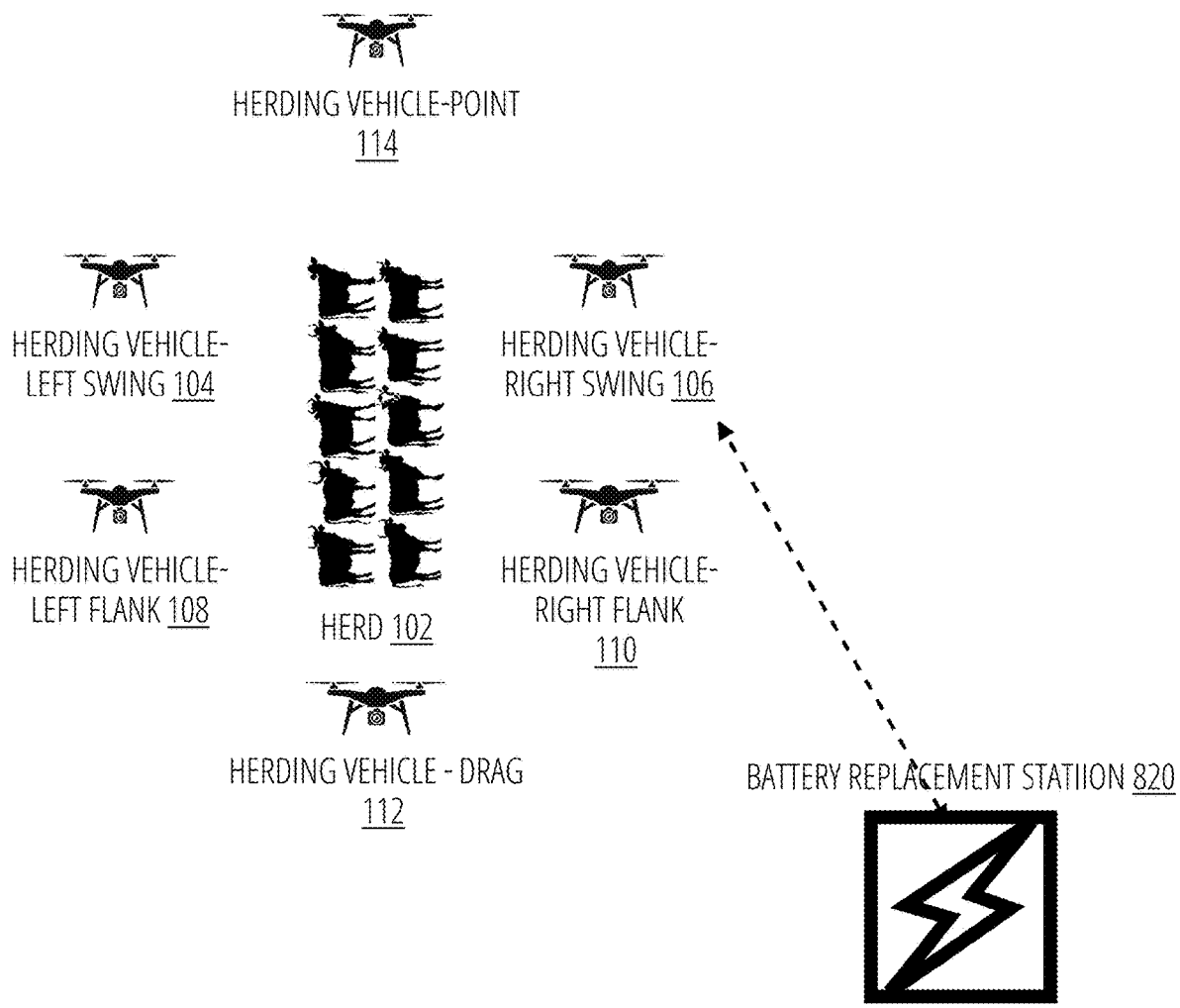
FIG. 8 depicts a herding vehicle leaving its station and proceeding to the battery replacement station for a new, fully charged battery.

When an animal or the herd is slow to respond to the presence of a herding vehicle within its stray flight zone 736, the trail boss module sends an alerter command to that herding vehicle, Alert (buzz, flash, shout, moo), causing the herding vehicle to engage in rapid back-and-forth movements and minor altitude changes (buzz), to emit flashing lights (flash), to emit sounds of animals distress (moo) and human cowboys sounds (shout). The sounds are commanded serially, but the light flashes, vehicle movements, and sounds may occur simultaneously. As depicted in FIG. 7, a stray catcher approaches a stray and reinforces the effect of its entry into the stray flight zone 736 by rapid back 1232 and forth 1234 movements by light flashes and by human cowboy sounds emitted over its loudspeaker 730, such as "ha-yah!" "Yee-hah" and "yip-yip-yip," interspersed with mooing sounds of distressed animals.

Figure 11:
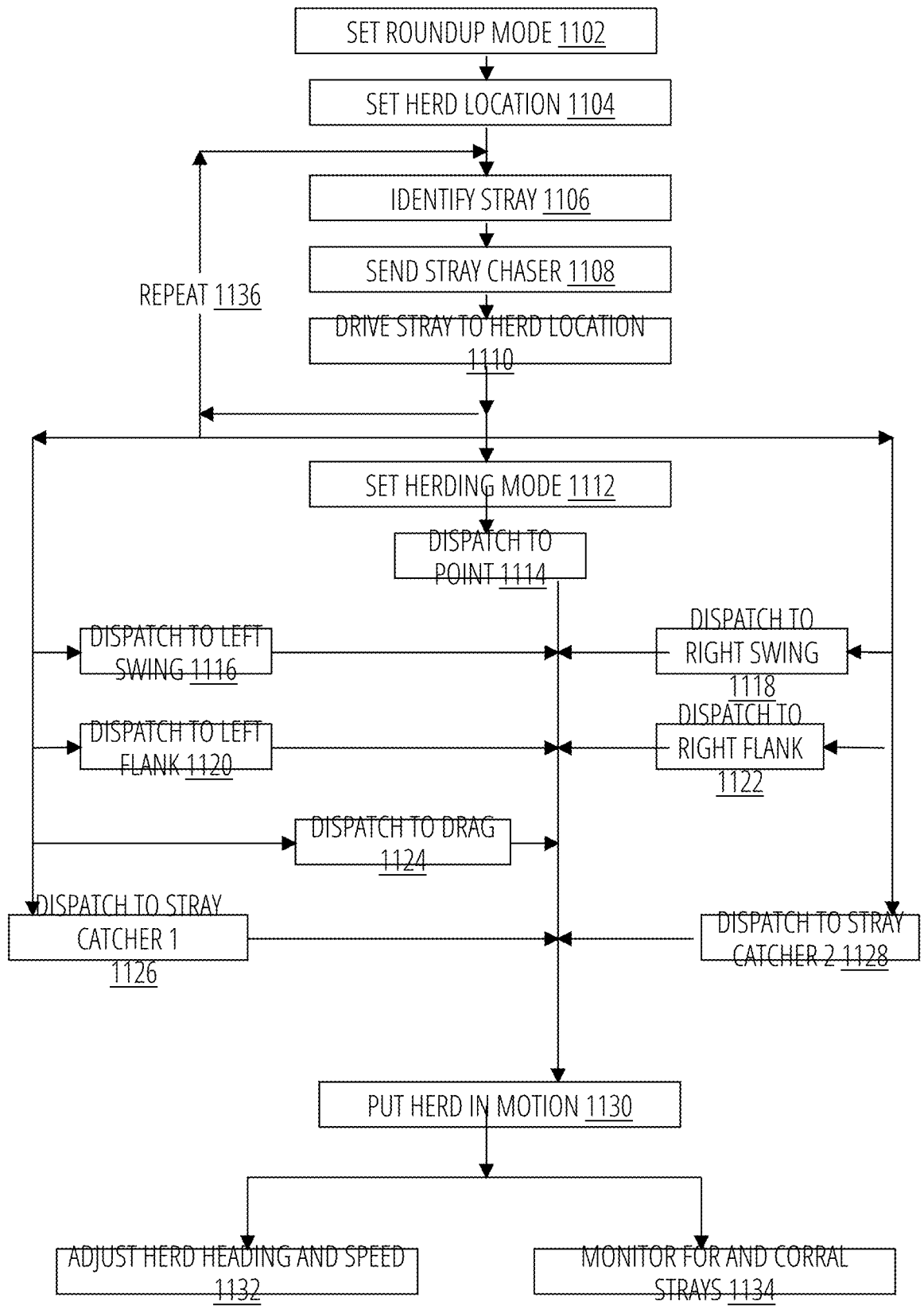
FIG. 11 is a flow chart depicting the roundup and herding modes.

FIG. 11 illustrates the method for using the system and the relationship between the roundup mode and the herding mode. Initially, the system is set to roundup mode 1102, and a herd location 1104 is specified where the herd is to be formed. Then the several stray catchers identify strays 1106, the trail boss module sends the closest stray chaser 1108 to drive stray to the herd location 1110. That process is repeated 1136 until all the strays have been rounded up.

Then, the herd transitions to herding mode 1212, and the trail boss module dispatches the herding vehicles to their various stations 1114 to 1128. Once all the herding modes are on station, the trail boss module commands them to put herd in motion 1130. Thereafter, the trail boss module issues the necessary commands to adjust herd heading and speed 1132, and the system simultaneously monitors for and corrals strays 1234 back into the herd.

Figure 12:
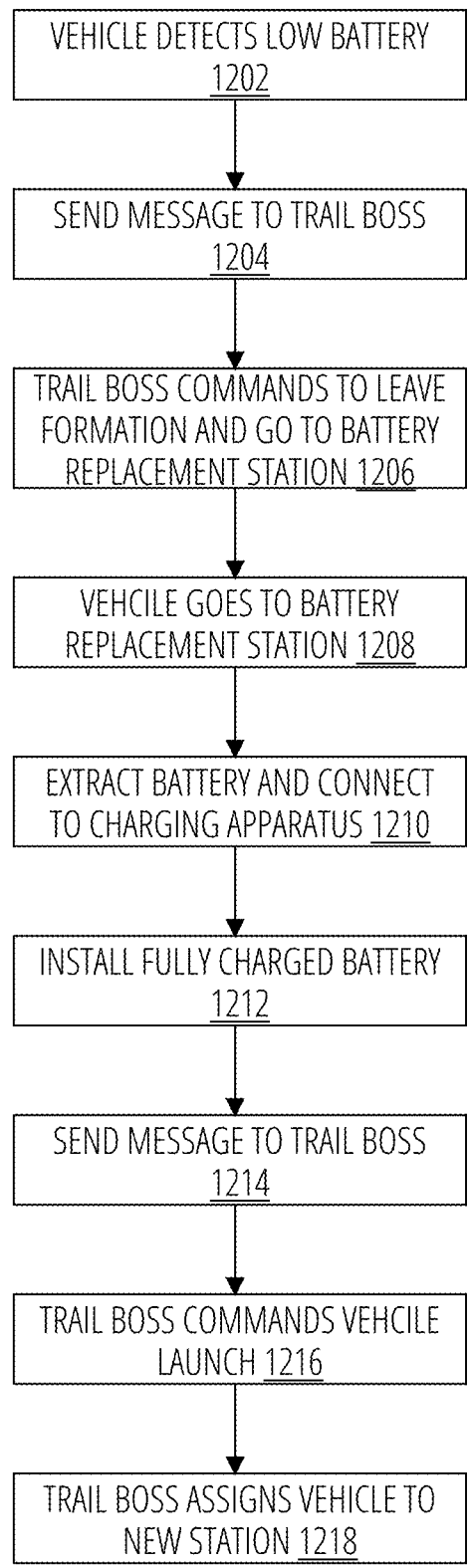
FIG. 12 is a flow chart depicting the battery replacement process.

FIG. 12 depicts the battery-replacement process. The battery-replacement station is a commercially available off-the-shelf automatic-landing-zone, battery-charger and battery-replacement system (the "battery battery-replacement station") capable of directing a vehicle to dock in the proper place on the landing zone, after which it removes the nearly depleted battery and places it on the charging apparatus. The apparatus inserts a fully charged battery into the vehicle.

When a vehicle detects that its battery is getting low—below 15% in the preferred embodiment—1202, it sends a message to the trail boss module 1204. The message causes the trail boss module to command the vehicle to leave formation and go to battery replacement station 1206. The trail boss module then sends a message to the nearest stray catcher vehicle instructing it to take up the station vacated by the vehicle that has left to receive a fresh battery 1208. The battery replacement station extracts the low battery and connects it to charging apparatus 1210 and installs a fully charged battery 1212. The herding vehicle then sends a message to the trail boss 1214, the trail boss commands vehicle launch 1216 and assigns the vehicle to a new station 1218, typically to the newly vacated stray catcher position.

The battery-replacement station can handle only one herding vehicle at a time, so the initial round of charging must be staggered lest all of the vehicles reach their critical charge point at the same time and require a visit to the battery-replacement station. The trail boss module is programmed to command an initial round charging, in which one vehicle is selected arbitrarily to visit the battery-replacement station and have its battery replaced, even though it may have 85 to 90% of a charge remaining. Then that vehicle, with a fully charged battery, returns to the formation, and a next vehicle is selected arbitrarily to visit the battery-replacement station for a battery replacement. This process proceeds until all of the vehicles have fresh batteries. After this initial round of battery replacement, the timing of battery depletion will be staggered. The first vehicle to have visited the battery-replacement station will reach the critical threshold first and visit again to receive a fresh battery, and so on through the entire collection of herding vehicles.

The battery-replacement station must be able to handle the initial round of charging with a sufficient number of fully charged batteries. No more batteries should be required than the total number of herding vehicles in the system.

The source of electrical power must be adequate to handle the total number of batteries. The battery-replacement station is powered by solar panels of appropriate size, approximately three square feet in area in the preferred embodiment. An auxiliary gasoline or diesel engine backs up the solar power in one embodiment. Fixed batteries in the battery-replacement station serve as a buffer and storage medium between the electrical source and the vehicle-battery charging apparatus.

I claim:

1. A system for herding animals comprising:
   a plurality of autonomous herding vehicles, assigned to stations; each equipped with a maintain-station module;
   a trail-boss module;
   a battery replacement station;
   radio links allowing the trail boss module and the plurality of autonomous herding vehicles to exchange digital messages; computing devices configured to
   launch the plurality of autonomous herding vehicles;
   locate individual animals and groups of animals;
   round up said individual animals and groups of animals and bunching them into a herd;
   determine a herd destination;
   operate a first autonomous vehicle of the plurality of autonomous herding vehicles to be positioned on the left side of the herd;
   operate a second autonomous vehicle of the plurality of autonomous herding vehicles to be positioned behind the herd;
   operate a third autonomous vehicle of the plurality of autonomous herding vehicles to be positioned to the right of the herd;
   operate a fourth autonomous vehicle of the plurality of autonomous herding vehicles to roam in the vicinity of the herd;
   determine a desired herd speed;
   cause the herd to move toward the destination at the desired speed by commanding one or more of the plurality of autonomous herding vehicles to enter the herd's flight zone, and positioning the plurality of autonomous herding vehicles forward of the herd's point of balance to cause the herd to move backwards or positioning the plurality of autonomous herding vehicles with back of the herd's point of balance to cause the herd to move forward;
   allow a vehicle of the plurality of autonomous vehicles to leave its position and move to the battery-replacement station to automatically receive a new fully charged battery;
   replace the vehicle that has left the formation to receive a new battery with another vehicle of the plurality of autonomous vehicles;
   detect one or more animals that has strayed from the herd; and
   send the fourth autonomous vehicle-to corral the strayed animal back into the herd.

2. The system for herding animals of claim 1, wherein the stations comprise: at least one point; at least one left swing; at least one left flank; at least one drag; at least one right flank; at least one right swing; at least one stray chaser; optionally one or more spares.

3. The system for herding animals of claim 1, wherein the autonomous herding vehicles are commercially available autonomous aerial vehicles.

4. The system for herding animals of claim 1, wherein the battery replacement station comprises:
   a commercially available landing pad, capable of: receiving a herding vehicle; removing the herding vehicle's battery; replacing the battery with a fully charged battery suitable for the herding vehicle; and accepting the herding vehicle's battery and charging it;

a source of electrical power; components that charge batteries.

5. The system for herding animals of claim 1, wherein the trail boss module comprises:
- a computer;
- a radio bus;
- a radio link;
- an API bus that communicates with a navigation and control system part of a remote control device associated with the plurality of autonomous herding vehicle;
- logic that enables the plurality of autonomous herding vehicles to direct and control the movements of the herd by movements of the plurality of autonomous herding vehicles, sounds, and visual cues.

6. A method for herding animals comprising:
- obtaining a landing pad and battery replacement station;
- obtaining a plurality of autonomous herding vehicles;
- launching the plurality of autonomous herding vehicles;
- locating individual animals and groups of animals;
- rounding up said individual animals and groups of animals and bunching them into a herd;
- determining a herd destination;
- operating a first autonomous vehicle of the plurality of autonomous herding vehicles to be positioned on the left side of the herd;
- operating a second autonomous vehicle of the plurality of autonomous herding vehicles to be positioned behind the herd;
- operating a third autonomous vehicle of the plurality of autonomous herding vehicles to be positioned to the right of the herd;
- operating a fourth autonomous vehicle of the plurality of autonomous herding vehicles to roam in the vicinity of the herd;
- determining a desired herd speed;
- causing the herd to move toward the destination at the desired speed by commanding one or more of the plurality of autonomous herding vehicles to enter the herd's flight zone, and positioning the plurality of autonomous herding vehicles forward of the herd's point of balance to cause the herd to move backwards or positioning the plurality of autonomous herding vehicles with back of the herd's point of balance to cause the herd to move forward;
- allowing a vehicle of the plurality of autonomous vehicles to leave its position and move to the battery-replacement station to automatically receive a new fully charged battery;
- replacing the vehicle that has left the formation to receive a new battery with another vehicle of the plurality of autonomous vehicles;
- detecting one or more animals that has strayed from the herd; and
- sending the fourth autonomous vehicle to corral the strayed animal back into the herd.

* * * * *